United States Patent
Sweeney et al.

(10) Patent No.: US 8,145,278 B2
(45) Date of Patent: Mar. 27, 2012

(54) SYSTEM AND METHOD FOR RINGTONE SHUFFLE

(75) Inventors: Jeffrey M. Sweeney, Olathe, KS (US); Kelsyn D. Rooks, Sr., Overland Park, KS (US); Michael C. Robinson, Overland Park, KS (US); Robert J. Morrill, Overland Park, KS (US); Charles E. Lumbirt, Overland Park, KS (US)

(73) Assignee: Embarq Holdings Company LLC, Overland Park, KS (US)

( * ) Notice: Subject to any disclaimer, the term of this patent is extended or adjusted under 35 U.S.C. 154(b) by 601 days.

(21) Appl. No.: 12/002,462

(22) Filed: Dec. 17, 2007

(65) Prior Publication Data

US 2009/0156265 A1    Jun. 18, 2009

(51) Int. Cl.
*H04B 1/38* (2006.01)
*H04M 1/00* (2006.01)

(52) U.S. Cl. .............. 455/567; 455/414.1; 455/418; 455/466; 455/419; 455/556.1; 455/41.2; 709/201; 707/101

(58) Field of Classification Search .......... 455/567, 455/414.1, 418, 466, 419, 566, 556.1, 41.2; 709/201; 707/101
See application file for complete search history.

(56) References Cited

U.S. PATENT DOCUMENTS

| | | | |
|---|---|---|---|
| 7,499,765 B2 * | 3/2009 | Lapstun et al. | 700/94 |
| 7,546,148 B2 * | 6/2009 | Small et al. | 455/567 |
| 7,548,875 B2 * | 6/2009 | Mikkelsen et al. | 705/26.8 |
| 7,610,044 B2 * | 10/2009 | Sindoni | 455/414.1 |
| 7,657,253 B2 * | 2/2010 | Lewis | 455/412.2 |
| 7,769,394 B1 * | 8/2010 | Zhu | 455/456.1 |
| 7,856,225 B2 * | 12/2010 | Silverbrook et al. | 455/406 |
| 7,969,959 B2 * | 6/2011 | Dabbs et al. | 370/349 |
| 2006/0276174 A1 * | 12/2006 | Katz et al. | 455/410 |
| 2007/0129114 A1 * | 6/2007 | Small et al. | 455/567 |
| 2007/0204042 A1 * | 8/2007 | Noble | 709/225 |
| 2007/0264969 A1 * | 11/2007 | Frank et al. | 455/404.2 |
| 2008/0057902 A1 * | 3/2008 | Sidon | 455/401 |
| 2008/0057922 A1 * | 3/2008 | Kokes et al. | 455/414.1 |
| 2008/0167993 A1 * | 7/2008 | Cue et al. | 705/51 |
| 2009/0042622 A1 * | 2/2009 | Tsui et al. | 455/567 |

* cited by examiner

*Primary Examiner* — Marceau Milord
(74) *Attorney, Agent, or Firm* — Patton Boggs LLP

(57) ABSTRACT

A system and method for shuffling ringtones. An identifier associated with a calling party is received. A selection of ringtones is received. The identifier is associated with the selection of ringtones. A communication is received from the calling party. Playback of one of the selection of ringtones is initiated on a communications device based on a user preference in response to determining the communication is associated with the identifier.

19 Claims, 6 Drawing Sheets

SYSTEM AND METHOD FOR RINGTONE SHUFFLE

BACKGROUND

The use of wireless devices has grown nearly exponentially in recent years. The growth is fueled by improved technologies and wireless communication protocols. Many users have come to depend on wireless devices as their sole or main form of communication. In many cases, these users seek to customize the features and service of their wireless device to best meet their respective needs. One way in which people customize their phone is through ringtones.

A ringtone or ring tone is the sound made by a telephone indicating a call or communication is incoming. The term, however, is most often used to refer to the customizable sounds available on mobile phones. This facility was originally provided so that people would be able to determine when their phone was ringing when in the company of other mobile phone owners. In many instances, a user may specify a song, quote, sound, rhythm, or other element to indicate a call or other communication is incoming. In some cases, a user may specify separate ringtones for individuals that frequently call the user. Based on the ringtone played at the time a communication is received, the user may be able to determine who is calling without looking at the caller identification information or answering the phone. Unfortunately, in many cases updating or changing ringtones may be difficult or require more effort than a user is willing to spend. As a result, a user may quickly tire of the ringtones he or she has chosen and instead select to cancel the ringtone service or not use ringtones.

SUMMARY

One embodiment includes a system and method for shuffling ringtones. An identifier associated with a calling party may be received. A selection of ringtones may be received. The identifier may be associated with the selection of ringtones. A communication may be received from the calling party. Playback of one of the selection of ringtones may be initiated on a communications device based on a user preference in response to determining the communication is associated with the identifier.

Another embodiment includes a system for shuffling ringtones. The system may include a server in communication with a user interface and a wireless device. The user interface may be configured to receive one or more identifiers associated with a calling party, and associate the one or more identifiers with a selection of ringtones. The system may also include a wireless device configured to communicate with the server through a wireless network. The wireless device may receive an incoming call, and play one of the selection of ringtones based on a user preference in response to determining the communication is associated with the identifier.

Yet another embodiment includes a wireless device configured for ringtone shuffle. The wireless device may include a processor for executing a set of instructions. The wireless device may also include a memory for storing the set of instructions. The set of instructions may be configured to receive an identifier associated with a calling party, associate the identifier with a selection of ringtones, receive a communication from the calling party, and play one of the selection of ringtones on a communications device based on user preferences in response to determining the communication is associated with the identifier.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
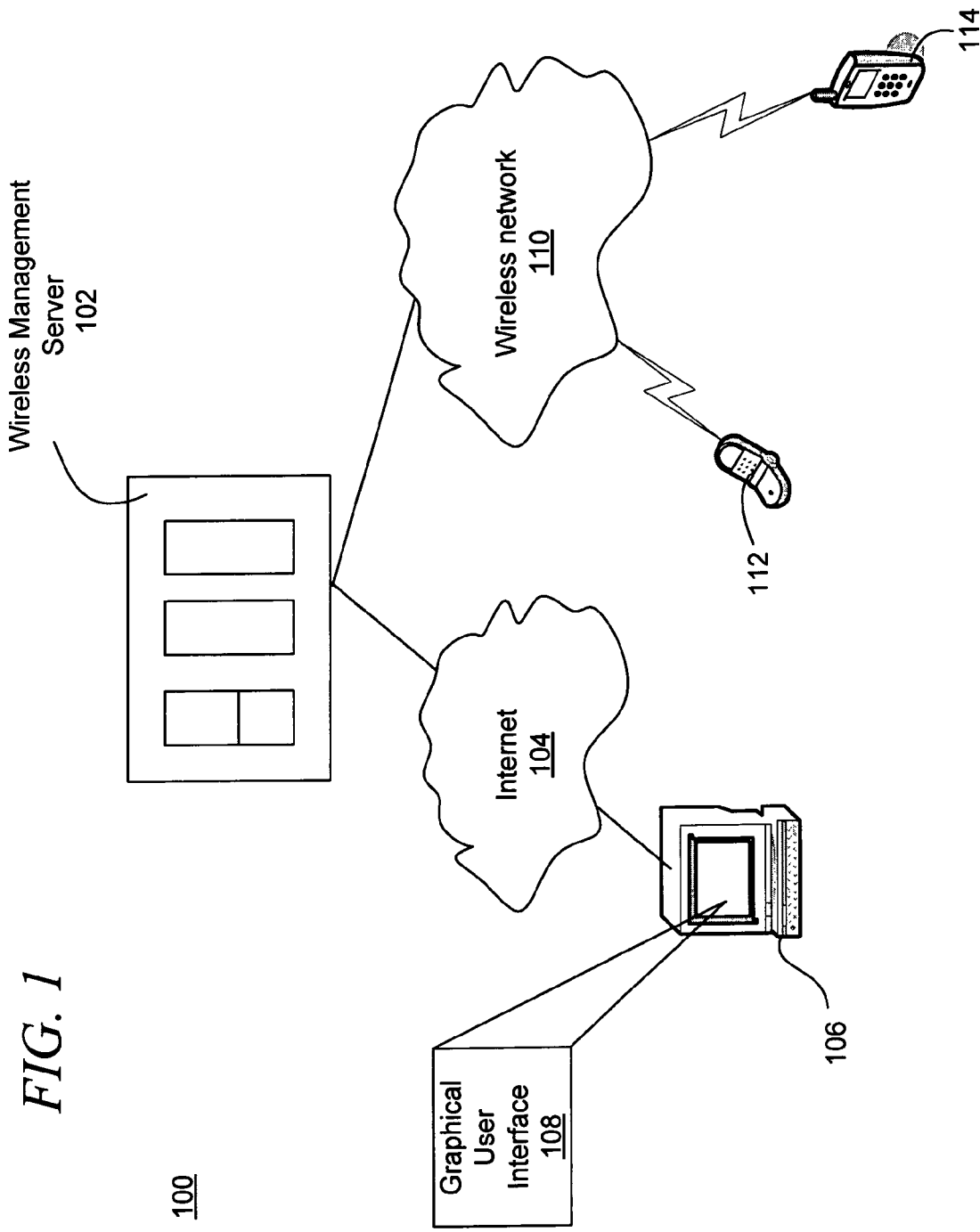
FIG. 1 is a pictorial representation of a wireless management system in accordance with the illustrative embodiment.

FIG. 1 is a pictorial representation of a wireless management system in accordance with an illustrative embodiment. The wireless management system 100 of FIG. 1 includes a wireless management server 102, Internet 104, a remote client 106, a graphical user interface (GUI) 108, a wireless network 110, and wireless devices 112 and 114.

The wireless management server 102 may be a single component or may be multiple interconnected devices as shown in the embodiment of FIG. 1. The wireless management server 102 may include multiple servers, switches, intelligent network devices, computing devices, components and corresponding software for performing the functions of a mobile switching center (MSC), wireless access network, switching network, and/or wireless public exchange. The wireless management server 102 may include an authentication space. The authentication space is a server or partition of a server designated for access by one or more users. The wireless management system 100 may communicate with any number of remote clients through the Internet 104.

The wireless management server 102 may perform configuration and changes for the wireless network 106 and devices in communication with the wireless network 110, such as wireless devices 112 and 114. For example, the wireless device 112 and 114 may request services, features, files, or other elements from the wireless management server 102 through the wireless network 110. As described, the user may download a ringtone portfolio to be associated with one or more callers or communicating parties. As used herein, a person or device that communicates with a user or receiving party is generically referred to as a calling party or caller. The wireless management server 102 may act as a gateway, proxy, Centrex, or interface into the wireless systems. In particular, the wireless network broadcasts wireless signals to the wireless devices 112 and 114. The wireless network 110 may use any number of broadcast transceivers, switches, hubs, routers, communications lines, and servers in addition to the wireless management server 102 to send and receive communications.

The wireless devices 112 and 114, may be any type of wireless devices including cellular phones, a Blackberry®, personal digital assistants (PDA), laptops, evolution data optimized (EDO) cards, multi-mode devices, and other wireless communications elements. The wireless network may use any number of wireless communication formats including, but not limited to code division multiple access (CDMA), global system for mobile (GSM) communications, time domain multiple access (TDMA), WiFi, and WiMAX. The wireless management server specifies how and when the wireless devices 112 and 114 communicate with other devices and other wireless networks, publicly switched networks, data networks, such as the Internet, and other public and private communications networks that interact with the wireless network 110.

The wireless management server 102, the wireless network 110, and the remote client 106 may communicate using a wired or wireless connection. For example, the remote client 106 may be connected to the wireless management server 102 by a fiber optic connection, Ti, cable, DSL, satellite, high-speed trunk, or wireless connection. The wireless management server 102 and the remote client 106 may communicate using any number of communications protocols. In one embodiment, the communication is a common channel signaling system 7 (SS7). SS7 refers to the exchange of information between communications components required to provide and maintain service. The communications may also be based on transmission control protocol (TCP) and Internet protocol (IP) standards.

The remote client 106 and components of the wireless management server 102 may be an advanced intelligence network (AIN) device. AIN devices allow the wireless management server 102 and remote client 106 to quickly and economically create and modify telecommunication services provided through the wireless network 110 for the users. For example, the wireless management server 102 may update ringtones synchronized to the wireless devices 112 and 114 based on information received from the remote client 106. The wireless management server 102 may be operated by a wireless service provider or other communications service provider A user may access the graphical user interface 108 in order to manage ringtone selections, associations, and playback for one or more of the wireless devices 112 and 114. A user may be first required to provide a secure identifier, such as a user name, password, or other authentication code or hardware interface that verifies that the user is authorized to make ringtone changes for the specified wireless device 112 and 114. This authentication information may be used to create a secured or unsecured connection between the remote client 106 and the wireless management server 102. The secure connection may be a virtual private network tunnel, an encrypted connection, firewall, or other form of secured communications link.

Once connected, the user may use the options, screens, and modules of the graphical user interface 108 to create ringtone selections, edit user preferences, select ringtones, and perform other tasks allowed within the authentication space. The authentication space of the server 118 is configured so that the remote client 106 may only make changes to wireless devices controlled by the authentication space 124. In one embodiment, the graphical user interface is a web page interface provided by the wireless management server 102. Wireless devices may also be connected to the remote client 106 using an electronic interface to identify, register and configure the wireless device.

Figure 2:
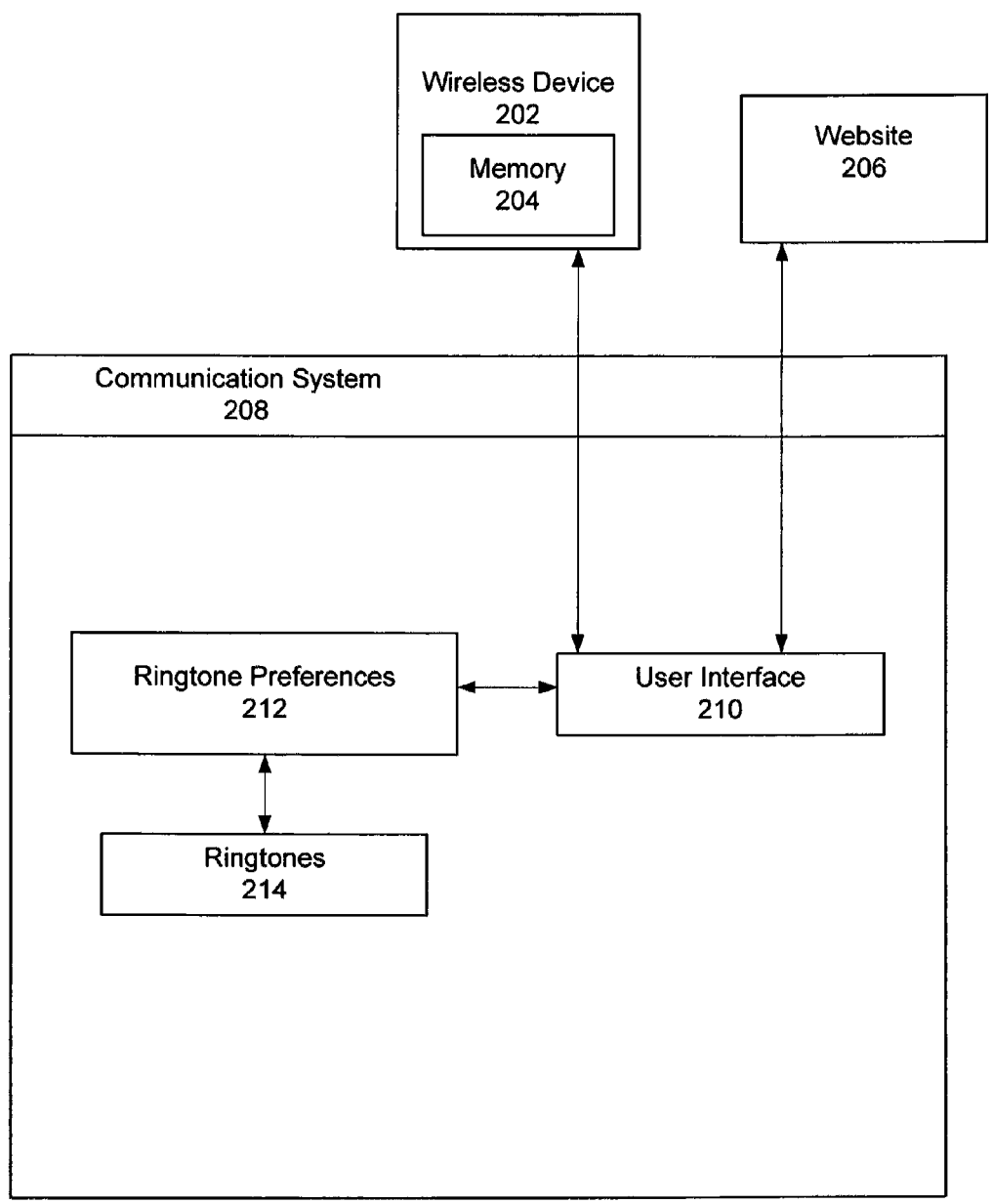
FIG. 2 is a block diagram of a system for configuring ringtones in accordance with an illustrative embodiment.

FIG. 2 is a block diagram of a system for configuring ringtones in accordance with an illustrative embodiment. A system 200 for configuring ringtones may include numerous elements including a wireless device 202 and memory 204, a website 206, and a communication system 208.

The communication system 208 may further include software modules, applications, or hardware including a user interface 210, ringtone preferences 212, and ringtones 214. The wireless device 202 is a particular implementation of the wireless device 102 of FIG. 1. The website 206 is a particular implementation of the graphical user interface 108 of FIG. 1. The communication system 208 is a particular implementation of the wireless management server 102 of FIG. 1. The communication system 200 may allow a user to establish preferences or otherwise configure the wireless device 202 or other communications device to play or implement ringtones based on incoming communications.

In one embodiment, the user may establish the ringtone preferences 212 and ringtones 214 by accessing the communication system 208 through the wireless device 202 or the user interface 210. In another embodiment, the elements of the communication system 208 may be stored and implemented from the memory 204 of the wireless device 202. For example, all the ringtone preferences 212 and ringtones may be stored locally on the wireless device 202 so that communications are not required between the wireless device 202 and the communication system 208 in order to implement the features and processes herein described. In yet another embodiment, the user may access the website 206 or other interface in order to establish the ringtone preferences 212 and the ringtones 214 that are played by the wireless device 202.

As previously described, the system 200 may be used to establish ringtone portfolio groupings or selections that may be played based on communications from one or more callers. The system 200 may allow the user to associate an identifier for each caller for determining which ringtone selection or grouping are to be played based on a incoming communication from the caller. The user interface 210 is an interface for receiving configurations, commands, data, or other information from the wireless device 202 or the website 206. The wireless device 202 and website 206 may communicate with the user interface 210 through a wireless or wired network connection.

In another embodiment, the user may access the Internet through the wireless device 202 in order to establish a connection with the user interface 210. The communication between the wireless device 202 and the website 206 with the user interface 210 may implemented through a secured connection or may require authentication, such as a user name, password, key identifiers, or other security information, in order to ensure that only an authenticated user is able to access the communication system 208.

The communication system 208 may be a server, mobile switching center, intelligent network device, switch, or other communications device used by a communication service provider to implement ringtone functionality. In one embodiment, the communication system 208 is a server which may include a processor, memory, transceiver, and other computing elements for communicating with the wireless device 202 and the website 206.

The ringtone preferences 212 are the preferences, instructions, commands, criteria, data or other information that control playback and implementation of the ringtones 214 by the wireless device 202. In particular, the user interface 210 may provide a graphical display or other interface allowing the user to visually, graphically, textually, or audibly set the preferences for the wireless device 202. Particular implementations of the user interface 210 are described in FIG. 3 and FIG. 4.

The ringtone preferences 212 set the type, order, amount, classification, content and other configuration of the ringtones 214. In one embodiment, the ringtone preferences 212 may be configured to automatically upload the ringtones 214 to the memory 204 of the wireless device 202 once the changes or configurations are made. In another embodiment, the ringtone preferences 212 may establish a synchronization time or update period for which the wireless device 202 automatically connects to the communication system 208 in order to update the ringtones 214 and/or the ringtone preferences 212.

In one example, the user may configure the ringtone preferences 212 to play a particular '80's rock band when the user's brother calls. The ringtones 214 included in the '80's rock band may be personally selected from the wireless device 202 or they may be randomly selected by the communication system 208 based on the ringtone preferences 212. The ringtone preferences 212 may be configured to randomly select an '80's rock song as a ringtone that is automatically uploaded bi-weekly to the wireless device 202 and played from the memory 204 anytime the user's brother calls or otherwise communicates with the wireless device 202. The ringtones 214 may be set to play any portion of a ringtone. In one embodiment, a different portion of a song may be played as a ringtone each time that ringtone is used in order to further avoid repetition in ringtone playback. For example, a ringtone selection for the user's mother may be set to play a portion of the top five country songs from the year the user's mother graduated from high school. The portion of the song played as a ringtone may vary each time so that different portions of the top five country songs are played until the ringtone selection is automatically or manually updated by the user.

In another embodiment, the ringtones 214 may include a ringtone library or access to another server, website, or device storing or serving ringtones or other information from which the user may select particular songs, genres, composers, artists, CDs, albums, time periods, eras, or other criteria for manually or automatically select or create ringtones. For example, the user may select ten classical songs from Mozart portions of which are to be played as ringtones anytime the user's grandmother calls. A different set of ten classical pieces of music from Bach may be played whenever the user's grandmother text messages or otherwise sends an electronic message. The ringtone preferences 212 may be set to sequentially play the ringtones 214 or to play them randomly or in another order specified by the user. For example, the user may set the ringtones 214 for the user's manager to play Beatles music in the order the songs were released. The ringtone preferences 212 allow the user the flexibility to set the preferences for playback of the ringtones 214 so that the user does not hear the same ringtone over and over again. Additionally, the user is encouraged to learn new music, songs, or otherwise enjoy the playback of ringtones 214 instead of hearing the same ringtones played repeatedly for the same callers.

The communication system 208 may include any number of computing elements that are not explicitly called out including a processor, memory, bus, transceivers, interfaces, and other hardware and software components. The processor may be a computer processor, or other processing device or element used by the communication system 400 to execute instructions, modules, logic, or otherwise process data.

The memory may be a static or dynamic storage medium, such as static random access memory, flash memory, or dynamic random access memory. However, the memory may be a hard disk, read-only memory, or other suitable form or combination of volatile or nonvolatile memory. The memory may store user preferences, data, information, applications, and instructions for execution by the processor to implement the ringtone shuffle functions of the communications system 208. The communication service provider operation the communication system 208 may ensure that a license or other rights is acquired to use the ringtones derived from copyrighted works by the service provider or by the user.

Figure 3:
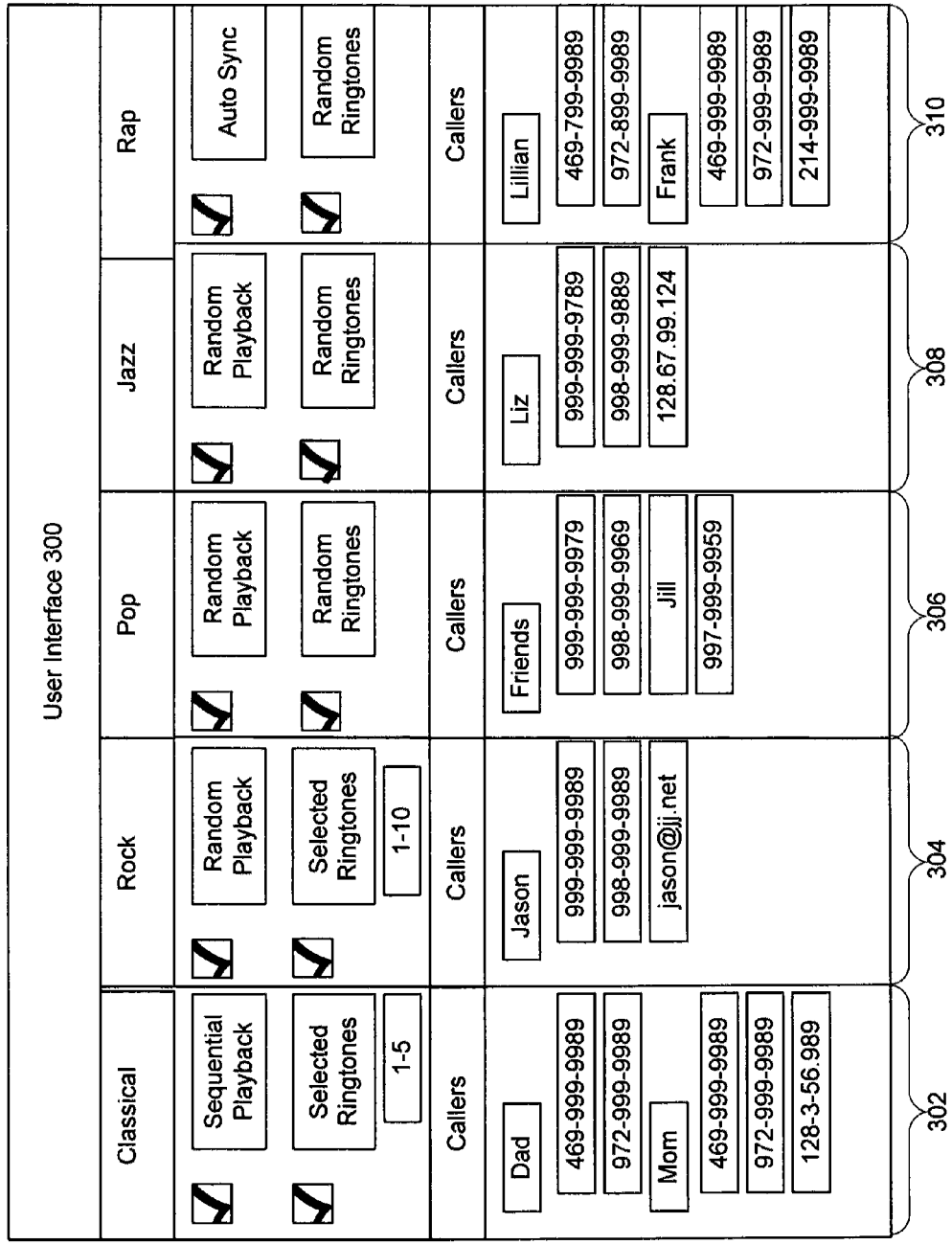
FIG. 3 is a representation of a graphical user interface for configuring a ringtone portfolio in accordance with an illustrative embodiment.

FIG. 3 is a representation of a graphical user interface for configuring a ringtone portfolio in accordance with an illustrative embodiment. FIG. 3 is a particular implementation of the user interface 210 that may be displayed by the website 206 or the wireless device 202, all of FIG. 2. The user interface may include any number of buttons, icons, lists, screens, columns, sections or other graphical selection elements. The user interface 300 includes sections 302, 304, 306, 308 and 310. In one embodiment, the user interface 300 may be part of a web page or web page graphic displayed to the user through as website on a wireless device, communications device, or computing device.

The user interface 300 may control how the ringtones are played to one or more callers. The example shown in FIG. 3 is for particular types of ringtones associated with music which may include classical, rock pop, jazz and rap. Any number of types of music in addition to those illustrated in the user interface 300 may also be utilized, including user defined or customized categories that are defined by the user, such as comedy routines, movie clips, and user created instrumentals or sounds.

As shown in section 302, the user may select an identifier that is linked to a number of ringtones. The identifier may be a phone number, IP address, user name, nickname, caller ID information, e-mail address, or other similar information that may be electronically determined or verified. The identifier for one or more callers may be linked with selected ringtones or randomly selected ringtones. One or more callers may be associated with each selection or grouping of ringtones. Additionally, any number of identifiers may be selected for each caller. For example, the user's father may be identified by a work number and a cell phone number, whereas, the user's mother may be identified by a home number, a cell phone number, and an IP address from which she may make calls to the user. The number of callers or identifiers for each of the callers that may be linked with a selection or portfolio of ringtones is not limited.

As shown in section 304, the user may select to randomly play any of ten selected ringtones when Jason calls or communicates using any of the listed identifiers or numbers. As a result when Jason calls the user, one of the ten selected ringtones is played to the user. The user interface 300 may also be used to list available ringtones by any category, type, classification, or other searchable criteria. In one embodiment, the user may be able to establish or create customized ringtones using music, quotes, sounds or other electronic materials.

As shown in section 306, random pop songs may be played whenever anyone within the friends category calls the user. As shown, the friends category may include four separate identifiers. The user interface 300 allows the user to customize the ringtones that are received and in some cases, the user may be required to guess who is calling based on the type of music played. For example, if the user receives a call and a jazz ringtone begins to play, the user may be able to determine that Liz is calling based on the information in section 308. However, if a pop ringtone begins to play, the user knows that any one of the people, individuals or wireless devices indicated by identifiers in section 306 may be calling the user. The result is a fun way to guess or determine who is calling the user and to make ringtones coming from the phone much more entertaining and fun.

As shown in section 310, the ringtones may also be set to automatically synchronize to the wireless device or communications device. As a result, the ringtones for section 310 are automatically uploaded to the wireless device for playback. The synchronization may occur manually based on a selection from the user or automatically based on user preferences. For example, the user may establish that the rap ringtones linked with Lillian and Frank are to be selected from a top ten list generated weekly. As a result, the top ten ringtones associated with rap songs may be uploaded to the wireless device for playback when a call is received from any of the identifiers listed in section 310.

Figure 4:
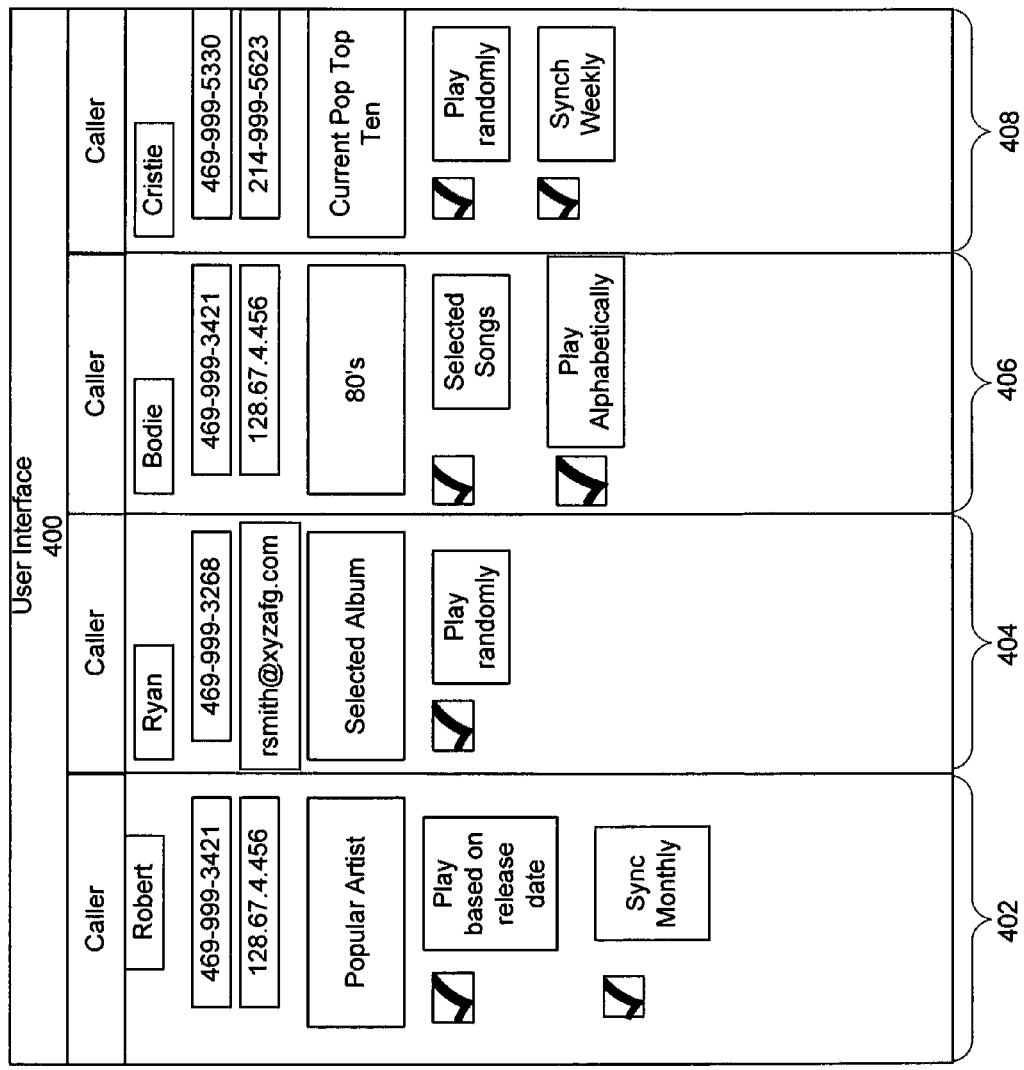
FIG. 4 is a representation of a graphical user interface for configuring a ringtone portfolio in accordance with an illustrative embodiment.

FIG. 4 is a representation of a graphical user interface for configuring a ringtone portfolio in accordance with an illustrative embodiment. FIG. 4 illustrates another embodiment of a user interface 400. The user interface may include sections 402, 404, 406 and 408. As before, the user may link any number of callers or identifiers with the selected ringtones. For example, as shown in section 402, anytime Robert calls and the identifiers listed are recognized by the wireless device, a ringtone associated with the popular artist is played based on the release date. Similarly, the ringtones played by the popular artist may be synchronized or updated daily, weekly, monthly, or as specified by the user. For example, the ringtone selections used one month may be replaced by all new ringtones selections the next month that are still sang by the popular artist.

As shown in section 404, the ringtones may also be generated from a selected album, such as music, comedy, instrumental, or other album collection. The ringtones may be played randomly when a communication is received from one of the phone numbers or e-mail addresses as shown.

As shown in section 406, the ringtones may be selected from an era, such as the '80's. As a result, the selected songs may be played in alphabetical order anytime the caller communicates with the user. The selected songs may also be manually picked by the user using the user interface 400 or another page or access point available from the user interface 400.

In section 408, the ringtones are based on the current pop top ten. For example, the ringtones may be selected from a list of the top ten most popular songs as determined by the communication service provider or other third party. The current pop top ten ringtones may be synchronized weekly and played randomly from the list whenever the listed caller calls the user. The section 408 may also specify alternatively listings, rating, or tracking for specifying ringtones. For example, the user may select to play the top five songs.

Figure 5:
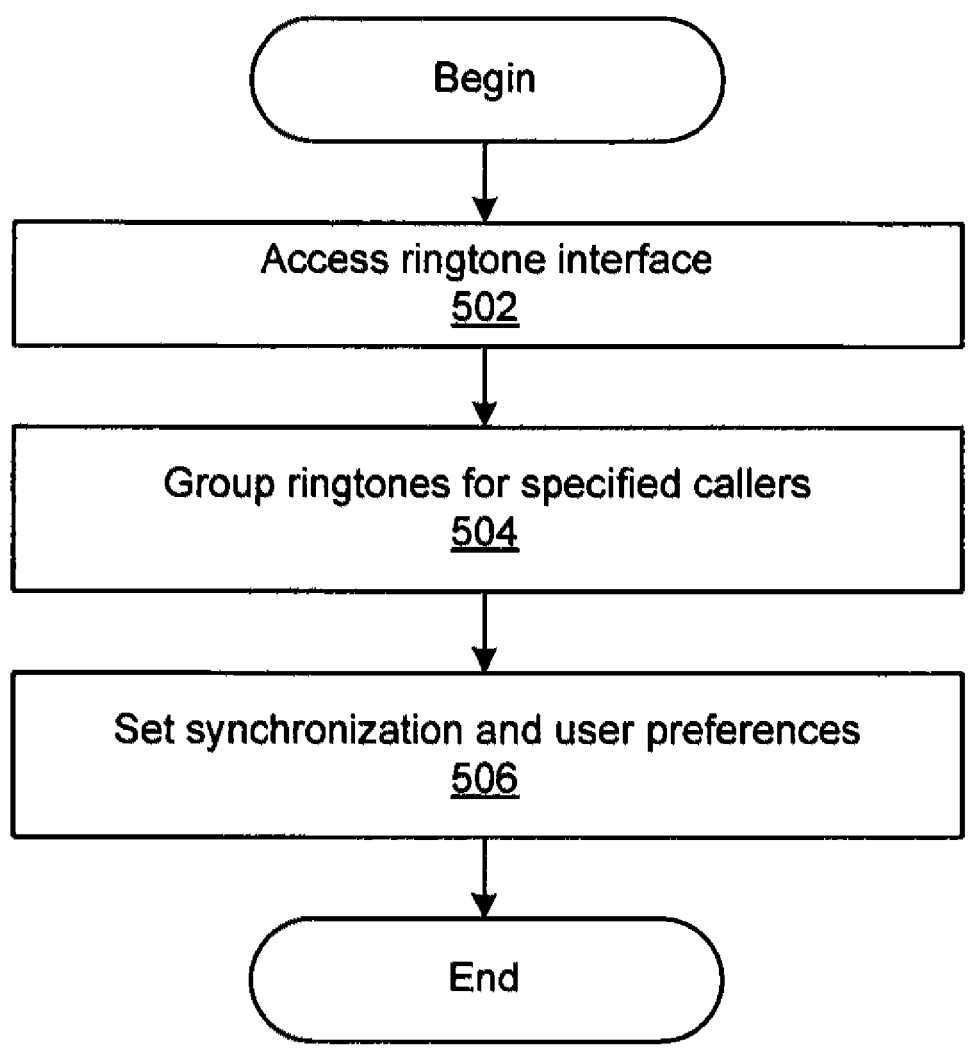
FIG. 5 is a flowchart of a process for associating ringtones with callers in accordance with an illustrative embodiment.

FIG. 5 is a flowchart of a process for associating ringtones with callers in accordance with an illustrative embodiment. The process of FIG. 5 may be implemented by a user utilizing a wireless device or other user interface, or another computing device to implement various ringtone features.

The process begins by first accessing a ringtone interface (step 502). As previously described, the ringtone interface may be a web page, touch screen of a wireless device, or other interface configured to receive feedback from a user. The user may be required to provide a password or access the ringtone interface from a particular wireless device.

Next, the user may group ringtones for specified callers (step 504). During step 504, the user may create ringtone portfolios or selections of ringtones that are to be played anytime a specified caller communicates with the user. The ringtones may be grouped with the callers using identifiers, which may include phone numbers, e-mail addresses, user names, IP addresses, caller identification information, or other data or information.

Next, the user sets synchronization and user preferences (step 506). During step 506, the user may set the ringtones to be automatically uploaded or downloaded to a wireless device. The user may also set the preferences that control playback of the ringtones, including how and when the ringtones are managed, selected and played. For example, a new set of ringtones may be set to automatically synchronize or download to the wireless device every other day. In another embodiment, the ringtones may be changed from one grouping to the next grouping based on the user preferences on a monthly basis.

Figure 6:
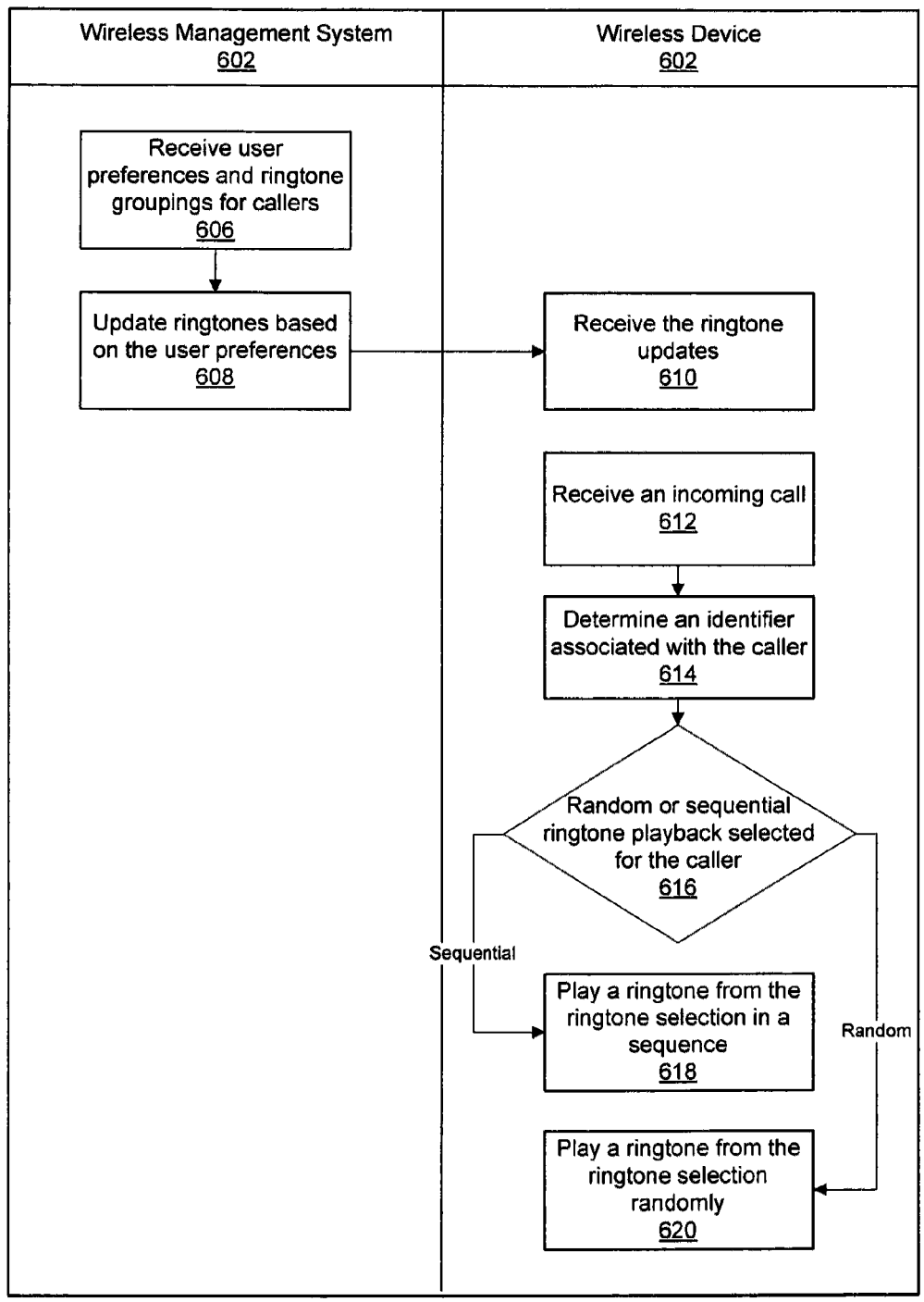
FIG. 6 is a flowchart of a process for playing a ringtone from a ringtone portfolio in accordance with an illustrative embodiment.

FIG. 6 is a flowchart of a process for playing a ringtone from a ringtone portfolio in accordance with an illustrative embodiment. The process of FIG. 6 may be implemented by a wireless management system 602 and a wireless device 604.

The wireless management system 602 receives user preferences and ringtone groupings for callers (step 606). The wireless management system 602 updates ringtones based on the user preferences (step 608). The updates of step 608 may occur based on criteria specified by the user in the user preferences. Alternatively, the ringtones may be updated based on a program or set feature of the ringtones service provided to the user.

Next, the wireless device 604 receives the ringtone updates (step 610). As a result, the wireless device 604 is periodically updated with new ringtones as selected by the user, or alternatively, the user may set the user preferences to receive new ringtones only when selected or manually indicated by the user using the wireless device 604. Although the wireless device 604 is described in FIG. 6, any number of communications devices including landline phones, voice over Internet Protocol (VoIP) telephones or other computing and communications devices may be used to implement the steps and process of FIG. 6.

The wireless device 604 may at anytime receive an incoming call (step 612). The incoming call may also be a phone call, text message, e-mail, instant chat, or other real-time or discreet electronic communication received by the wireless device 604. The wireless device 604 determines an identifier associated with the caller (step 614). The identifier may be any information or data that links the caller with a grouping or one or more ringtones. In one embodiment, the wireless device 604 may be unable to link the caller with an identifier or other associated information. As a result, a default ringtone or ringtone grouping may be played to the user or a ringtone indicating that the identifier is not recognized. The user may set a ringtone grouping for callers that have identifiers that are not recognized by the wireless device 602.

The wireless device 604 determines whether random or sequential ringtone playback is selected for the caller (step 616). Random or sequential ringtone playback may be selected by the user in the user preferences. If sequential playback is selected, the wireless device 604 plays a ringtone from the ringtone selection in a sequence (step 618). The sequence may be established by the user and user preferences. For example, the sequence may be based on release date, track number, alphabet, user rating, or other information or criteria selected by the user. If the determination of step 616 is for random playback the wireless device 604 plays a ringtone from the ringtone selection randomly (step 620). As a result, the ringtones are played randomly whenever the caller calls or communicates with the wireless device 604.

The previous detailed description is of a small number of embodiments for implementing the invention and is not intended to be limiting in scope. The following claims set forth a number of the embodiments of the invention disclosed with greater particularity.

What is claimed:

1. A method for shuffling ringtones, the method comprising:
   receiving a selection of an identifier associated with a communicating party on a receiving device;
   receiving a selection of a plurality of ringtones;
   associating the identifier with the plurality of ringtones on the receiving device in response to user input;
   receiving a communication from the communicating party; and
   initiating playback of one of the plurality of ringtones on the receiving device based on user preferences in response to determining the communication is associated with the identifier, the user preferences enable the selection of the plurality of ringtones to be played (1) randomly, and (2) sequentially.

2. The method according to claim 1, wherein the identifier is any of a caller identification, phone number, email address, user name, and IP address.

3. The method according to claim 1, wherein the selection of the plurality of ringtones identifies a performance artist.

4. The method according to claim 1, wherein the selection of the plurality of ringtones identifies a music genre.

5. The method according to claim 1, further comprising:
   automatically updating the selection of the plurality of ringtones based on a criteria, the updating is enabled to be performed from ringtones on the receiving device and ringtones available through a network connection.

6. The method according to claim 5, wherein automatically updating further comprises:
   downloading the plurality of ringtones to the communications device at a specified interval.

7. The method according to claim 1, further comprising:
   playing one of the plurality of ringtones for a call, email, text message, and other electronic messages associated with the identifier according to the user preferences.

8. The method according to claim 1, wherein the user preferences are configured to play a different portion of each of the plurality of ringtones for a plurality of communications including the communication until all portions of the plurality of ringtones have been played thereby avoiding repetition.

9. The method according to claim 1, wherein the plurality of ringtones are played sequentially in a user-selected order or in an automatically determined order.

10. The method according to claim 1, wherein the plurality of ringtones includes one or more of an artist, songwriter, composer, compact disk, album, genre, era, rating, chart record, musical category, and user-defined category.

11. A communication system for shuffling ringtones, the system comprising:
   a server in communication with a user interface and a receiving wireless device, the user interface configured to receive one or more identifiers associated with a communicating party, and associate the one or more identifiers with a selection of a plurality of ringtones;
   the receiving wireless device configured to communicate with the server through a wireless network, wherein the receiving wireless device receives a communication, and plays one of the plurality of ringtones based on user preferences in response to determining the communication is associated with the identifier, the user preferences enable the selection of the plurality of ringtones to be played (1) randomly, and (2) sequentially.

12. The system according to claim 11, further comprising:
   a database in communication with the server, the database configured to store and update the selection of the plurality of ringtones utilizing one or more criteria, wherein the plurality of ringtones and the user preferences entered through the user interface are uploaded to the receiving wireless device.

13. The system according to claim 11, wherein the one or more identifiers and the selection of the plurality of ringtones are associated and then synchronized between the server and the receiving wireless device based on input received from the user.

14. The system according to claim 11, wherein the plurality of ringtones includes ringtones separated by any of artist, album, era, and music type.

15. The system according to claim 11, wherein the selection of the plurality of ringtones is enabled to be played for communications including a phone call, text message, email message, chat message, and voicemail message, and wherein the user preferences are configured to play a different portion of each of the plurality of ringtones for the communication until all portions of the plurality of ringtones have been played thereby avoiding repetition.

16. A wireless device configured for ringtone shuffle, said device comprising:
   a processor for executing a set of instructions; and
   a memory for storing the set of instructions, wherein the set of instructions are configured to receive an identifier associated with a communicating party, associate the identifier with a selection of a plurality of ringtones, receive a communication from the communicating party, and play one of the plurality of ringtones on a communications device based on user preferences in response to determining the communication is associated with the identifier, wherein the user preferences enable the selection of the plurality of ringtones to be played (1) randomly, and (2) sequentially, and wherein the user preferences are configured to play a different portion of each of the plurality of ringtones for communications from the communicating party until all portions of the plurality of ringtones have been played thereby avoiding repetition.

17. The wireless device according to claim 16, wherein the set of instructions:
   automatically updates the selection of the plurality of ringtones through a communications network as specified by the user preferences.

18. The wireless device according to claim 16, wherein the communication is a phone call, and wherein each of a plurality of contacts and associated identifiers are associated with one or more selections of ringtones.

19. The wireless device according to claim 16, wherein the selection of the plurality of ringtones is enabled to be played for communications including a phone call, text message, chat message, email message, picture message, and voicemail message.

* * * * *